United States Patent
Khammar et al.

(10) Patent No.: US 9,624,419 B2
(45) Date of Patent: Apr. 18, 2017

(54) METHODS FOR PRODUCING FLUID MIGRATION RESISTANT CEMENT SLURRIES

(71) Applicant: Halliburton Energy Services, Inc., Houston, TX (US)

(72) Inventors: Merouane Khammar, Houston, TX (US); Flavio H. Marchesini, Rio de Janeiro (BR); Ashok Santra, The Woodlands, TX (US); Maria das Dores M. Paiva, Natal (BR); Thomas Sodhi, New Caney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/360,850

(22) PCT Filed: Jan. 2, 2014

(86) PCT No.: PCT/US2014/010027
§ 371 (c)(1),
(2) Date: May 27, 2014

(87) PCT Pub. No.: WO2014/120385
PCT Pub. Date: Aug. 7, 2014

(65) Prior Publication Data
US 2015/0232736 A1    Aug. 20, 2015

Related U.S. Application Data

(60) Provisional application No. 61/758,393, filed on Jan. 30, 2013.

(51) Int. Cl.
*C04B 28/02*   (2006.01)
*C09K 8/46*   (2006.01)
(Continued)

(52) U.S. Cl.
CPC ............... *C09K 8/46* (2013.01); *C04B 28/02* (2013.01); *C09K 8/467* (2013.01); *C09K 8/487* (2013.01); *E21B 33/14* (2013.01)

(58) Field of Classification Search
CPC .................... C09K 8/46; E21B 33/14
See application file for complete search history.

(56) References Cited

U.S. PATENT DOCUMENTS

| 4,480,693 A | * | 11/1984 | Newlove et al. | 166/293 |
| 4,582,139 A | * | 4/1986 | Childs et al. | 166/293 |

(Continued)

FOREIGN PATENT DOCUMENTS

| WO | 2005090750 A1 | 9/2005 |
| WO | 2007031736 A1 | 3/2007 |

(Continued)

OTHER PUBLICATIONS

Schlangen, E. and Garboczi, E. J. "Fracture Simulations of Concrete Using Lattice Models: Computational Aspects." Engineering Fracture Mechanics. vol. 57. Pergamon, 1997. 319-332. Print.*

(Continued)

*Primary Examiner* — Zakiya W Bates
*Assistant Examiner* — Crystal J Miller
(74) *Attorney, Agent, or Firm* — McDermott Will & Emery LLP

(57) ABSTRACT

Methods including providing a wellbore in a subterranean formation; providing a proposed cement slurry; calculating a fluid migration threshold; manipulating the proposed cement slurry based on the fluid migration threshold so as to produce a fluid migration resistant cement slurry; introducing the fluid migration resistant cement slurry into the wellbore in the subterranean formation; and curing the fluid migration resistant cement slurry in the wellbore in the subterranean formation.

18 Claims, 13 Drawing Sheets

(51) Int. Cl.
*E21B 33/14* (2006.01)
*C09K 8/487* (2006.01)
*C09K 8/467* (2006.01)

(56) References Cited

U.S. PATENT DOCUMENTS

| | | | |
|---|---|---|---|
| 4,632,186 A | 12/1986 | Boncan et al. | |
| 5,020,594 A * | 6/1991 | Gill | E21B 33/14 166/285 |
| 5,207,831 A * | 5/1993 | Cowan | 106/724 |
| 6,136,935 A | 10/2000 | Udarbe et al. | |
| 6,145,591 A * | 11/2000 | Boncan | C04B 14/106 106/614 |
| 6,508,305 B1 * | 1/2003 | Brannon et al. | 166/293 |
| 6,626,243 B1 * | 9/2003 | Go Boncan | 166/293 |
| 6,697,738 B2 | 2/2004 | Ravi | |
| 7,044,222 B2 * | 5/2006 | Tomlinson | 166/292 |
| 7,740,070 B2 * | 6/2010 | Santra et al. | 166/300 |
| 8,540,025 B2 * | 9/2013 | Reddy et al. | 166/293 |
| 2003/0163257 A1 * | 8/2003 | Ravi | E21B 33/14 702/6 |
| 2004/0040711 A1 * | 3/2004 | Tomlinson | 166/292 |
| 2004/0083058 A1 * | 4/2004 | Ravi | E21B 33/14 702/6 |
| 2004/0244977 A1 | 12/2004 | Luke et al. | |
| 2005/0241829 A1 * | 11/2005 | Ravi | E21B 33/14 166/293 |
| 2007/0062691 A1 * | 3/2007 | Reddy | C04B 28/02 166/250.01 |
| 2007/0209796 A1 | 9/2007 | Santra et al. | |
| 2008/0099203 A1 | 5/2008 | Mueller et al. | |
| 2009/0308611 A1 * | 12/2009 | Santra et al. | 166/293 |
| 2010/0212892 A1 * | 8/2010 | Santra | C04B 28/32 166/250.14 |
| 2011/0278006 A1 * | 11/2011 | Sanders et al. | 166/293 |
| 2011/0297378 A1 * | 12/2011 | Reddy et al. | 166/293 |
| 2012/0264658 A1 | 10/2012 | Kulkarni | |
| 2013/0118752 A1 * | 5/2013 | Hannegan et al. | 166/336 |
| 2014/0048264 A1 * | 2/2014 | Chatterji et al. | 166/292 |
| 2014/0326455 A1 * | 11/2014 | Ravi et al. | 166/293 |
| 2015/0284621 A1 * | 10/2015 | Marchesini | E21B 33/14 166/293 |

FOREIGN PATENT DOCUMENTS

| | | | |
|---|---|---|---|
| WO | 2010125327 A1 | 11/2010 | |
| WO | WO 2014070503 A1 * | 5/2014 | |
| WO | 2014120385 A1 | 8/2014 | |

OTHER PUBLICATIONS

Fischer Cripps, Anthony C. "Linear Elastic Fracture Mechanics." Introduction to Contact Mechanics. 2nd ed. Springer US, 2007. Ch. 2.31-48. Print.*

International Search Report and Written Opinion for PCT/US2014/010027 dated Apr. 22, 2014.
Johnson B. D., Mechanical response of sediments to bubble growth, Marine Geology, vol. 187, (2002), pp. 347-363.
B. P. Boudreau, The physics of bubbles in surficial, soft, cohesive sediments, Marine and Petroleum Geology 38 (2012) 1-18.
M. A. Barry, Bruce D. Johnson, B. P. Boudreau, A new instrument for high-resolution in situ assessment of Young's modulus in shallow cohesive sediments, Geo-Mar Lett (2012) 32:349-357.
B. D. Johnson, M. A. Barry, B. P. Boudreau, P. A. Jumars, K. M. Dorgan, In situ tensile fracture toughness of surficial cohesive marine sediments, Geo-Mar Lett (2012) 32:39-48.
M. A. Barry, B. P. Boudreau, B. D. Johnson, and A. H. Reed, First-order description of the mechanical fracture behavior of fine-grained surficial marine sediments during gas bubble growth, Journal of Geophysical Research, vol. 115, F04029, doi:10.1029/2010JF001833, 2010.
Jain & Juanes, Preferential Mode of gas invasion in sediments, Grain scale mechanistic model of coupled multiphase fluid flow and sediment mechanics, J Geophysical Res vol. 114 2009.
Horseman, Gas Migration in clay barriers, Eng Geology 54 1999 139-149.
Harrington & Horseman, 1999, Gas transport of clays and mudrocks, Muds and Mudstones—Physical and Fluid Flow Properties 1999 158 107-124.
Gardiner et al 2003, Growth of disk shaped bubbles in sediments, Geochimica et Cosmochimica Acta, vol. 67, No. 8, pp. 1485-1494.
Kurzon I., Lyakhovsky V., Oded N., "Bubble growth in visco-elastic magma: implications to magma fragmentation and bubble nucleation," Bull Vulcanol vol. 73, pp. 39-57 (2001).
Bagdassarov N. S., DingwellD. B., Wilding M. C.,"Rhyolite magma degassing: an experimental study of melt vesiculation", Bull Volcanol, vol. 57, pp. 587-601, (1996).
Beris A. N., Tsamopoulos J. A., Armstrong R.C., Brown R. A., "Creeping motion of a sphere through a Bingham plastic", J. Fluid Mechanics. vol. 158, pp. 219-244, (1985).
Dubash N, Frigaard I., Conditions for static bubbles in viscoelastic fluids, Physics of fluids, vol. 16, N 12, (2004).
Dubash N., Frigaard I .,"Propagation and stopping of air bubbles in carbopol solutions", J. Non-Newtonian Fluid Mechanics, vol. 142, pp. 123-134, (2007).
Stewart R. B., Schouten F.C.,"Gas Invasion and Migration in Cemented Annuli: Causes and~Cures", SPE 14779, (1988).
Tuffen Hugh, Rosanna S., Sammonds P.R., "Evidence for seismogenic fracture of silicic magma", Nature, vol. 453, pp. 511-514, (2008).
Halliburton, "Transition Time of Cement Slurries Between the Fluid and Set States," SPE 9285 (1982).
Extended European Search Report received in corresponding EP Application No. 14746575.1, dated Sep. 16, 2016.

* cited by examiner

METHODS FOR PRODUCING FLUID MIGRATION RESISTANT CEMENT SLURRIES

CROSS-REFERENCE TO RELATED APPLICATIONS

The present application claims the benefit of priority under 35 U.S.C. §371 as a national stage of U.S. International Application No. PCT/US2014/010027, entitled "Methods for Producing Fluid Migration Resistant Cement Slurries," and filed on Jan. 2, 2014, which claims the benefit under 35 U.S.C. §119 as a nonprovisional of U.S. Provisional Patent Application No. 61/758,393, entitled "Methods for Producing Fluid Migration Resistant Cement Slurries," and filed on Jan. 30, 2013, the disclosures of which are hereby incorporated by reference in their entirety for all purposes.

BACKGROUND

The embodiments herein relate to methods for producing fluid migration resistant cement slurries.

Subterranean formation operations (e.g., stimulation operations, sand control operations, completion operations, etc.) often involve placing a cement sheath around a casing (or liner string) in a wellbore. The cement sheath is formed by pumping a cement slurry through the bottom of the casing and out through an annulus between the outer casing wall and the formation face of the wellbore. The cement slurry then cures in the annular space, thereby forming a sheath of hardened cement that, inter alia, supports and positions the casing in the wellbore and bonds the exterior surface of the casing to the subterranean formation. This process is referred to as "primary cementing." Among other things, the cement sheath may keep fresh water zones from becoming contaminated with produced fluids from within the wellbore. As used herein, the term "fluid" refers to liquid phase fluids and gas phase fluids. The cement sheath may also prevent unstable formations from caving in, thereby reducing the chance of a casing collapse and/or stuck drill pipe. Finally, the cement sheath forms a solid barrier to prevent fluid loss or contamination of production zones. The degree of success of a subterranean formation operation involving placement of a cement sheath therefore depends, at least in part, upon the successful cementing of the wellbore casing.

Cement slurries are typically designed to have a hydrostatic pressure between the formation pore pressure and the fracture gradient of the formation to prevent fluid migration within the cement slurry and prevent fracturing of the subterranean formation. As used herein, the term "formation pore pressure" refers to the pressure of the subsurface formation fluids within the subterranean formation itself. As used herein, the term "fracture gradient" refers to the pressure required to induce or enhance fractures in a subterranean formation at a given depth. During cement hydration, the hydrostatic pressure of the cement slurry decreases and it may drop below the formation pore pressure, allowing fluid invasion and migration within the cement slurry, a common obstacle of primary cementing. As used herein, the term "hydrating cement slurry" refers to a cement slurry that has not fully hydrated and become a solid, hardened mass.

Fluid migration can present significant economic and environmental challenges. For example, fluid may migrate through channels within the hydrating cement slurry to a lower pressure portion of the slurry or to the surface of the subterranean formation. As used herein, the term "channel" refers to a defect in the quality of cement, where the cement does not fully occupy the annulus between the casing and the formation face. The migration may result in substandard performance of the cured cement sheath resulting in failure of zonal isolation or wellbore structure failure. Failure of zonal isolation could result in environmental contamination, which may cause harm to both flora and fauna, including humans. The pressure created by the fluid migration may also lead to a well blowout. Because of the potentially costly effects of fluid migration on a cement sheath, both in economic and environmental terms, a number of methods have been established to evaluate the potential of fluid migration within a hydrating cement slurry. These methods focus solely on the hydration kinetics profile of the cement slurry itself. As used herein, the term "hydration kinetics profile" refers to the time required to fully hydrate the cement slurry into a hardened sheath. Specifically, the hydration kinetics profile depends upon any property of the cement slurry that contributes to the curing, strength, and hydrostatic pressure of the cement slurry within a subterranean formation (e.g., compressibility, shrinkage, shear rate, and rheological properties of the cement).

However, potential of fluid migration into a hydrating cement slurry is also dependent upon the fluid migration threshold of the cement slurry. As used herein, the term "fluid migration threshold" or "fluid migration threshold pressure" refers to the critical pressure required to cause a break (e.g., cause crack propagation of a fluid or a fluid bubble) in a hydrating cement slurry. Typically, crack propagation occurs when an outside pressure exceeds the sum of the horizontal and tensile stress pressures exerted by the hydrating cement slurry at a particular time. As used herein, the term "crack propagation" refers to a fluid migration profile in which the migrating fluid creates a more or less longitudinal or lengthwise artery, conduit, or channel. Crack propagation of a fluid bubble within a hydrating cement slurry may be compared to a worm burrowing through a cohesive marine sediment or a gelatin substance. The burrowing worm creates a stress field dorsal and anterior to itself and a more or less longitudinal or lengthwise artery or conduit extending anteriorly to its body. The crack propagation of a fluid bubble may also be compared to methane bubble growth in cohesive marine sediment.

A comprehensive method of predicting fluid migration potential after primary cementing in order to produce a fluid migration resistant cement slurry would be beneficial to one of ordinary skill in the art.

BRIEF DESCRIPTION OF THE FIGURES

The following figures are included to illustrate certain aspects of the embodiments herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate to methods for producing fluid migration resistant cement slurries.

When a cement slurry hydrates in an annulus between a casing and a subterranean formation, it forms a gel structure. When the hydrostatic pressure of the hydrating cement slurry drops below the formation pore pressure, the risk of fluid migration depends, at least in part, on the excess pressure and the mechanical properties of the gel structure of the cement slurry. If fluid percolates into the gel structure, fluid bubbles may grow by tensile crack propagation, causing the cement to form a cracked sheath upon complete hydration.

Figure 1:
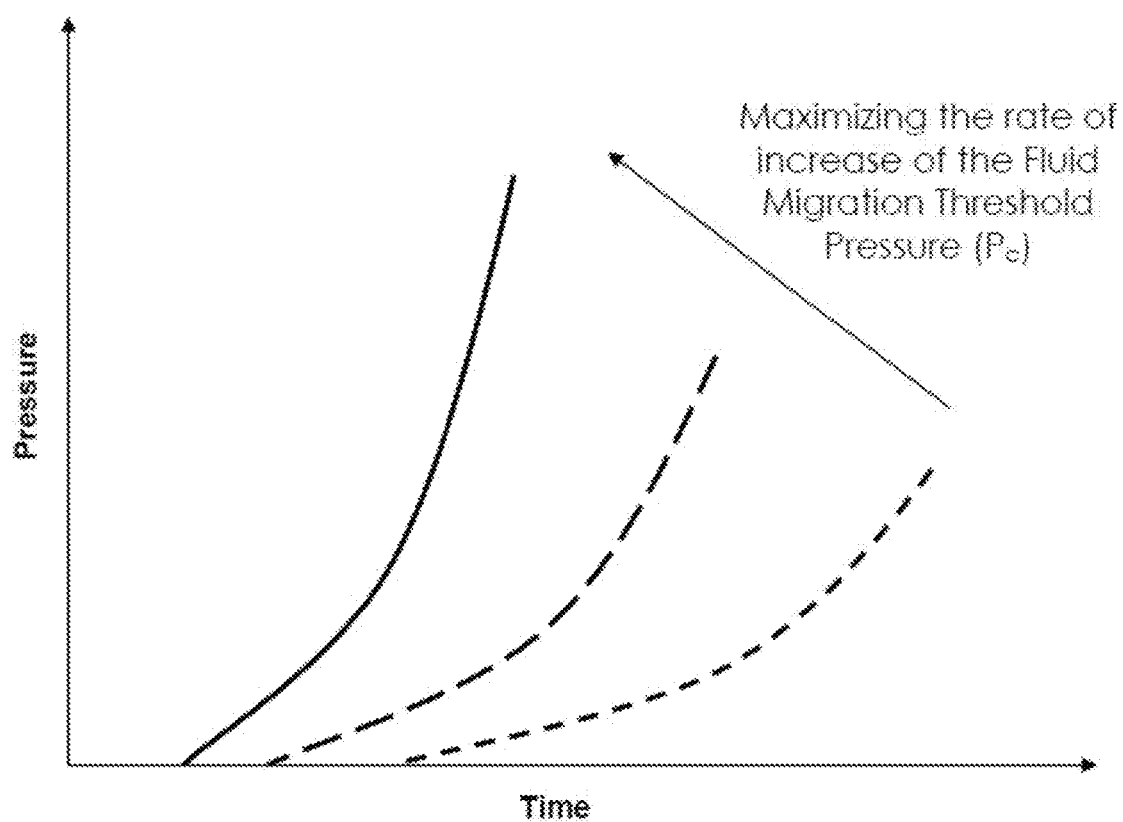
FIG. 1 is a graphic illustration of a goal of the embodiments herein to maximize the rate of increase over time of the fluid migration threshold, the critical pressure required to cause a break or crack propagation in a hydrating cement slurry so as to reduce the potential of fluid migration.

The embodiments herein relate to predicting the fluid migration potential in a proposed cement slurry (as used herein, the term "proposed cement slurry" and "the cement slurry" are used interchangeably) after primary cementing in order to produce a fluid migration resistant cement slurry. The embodiments herein provide for methods that evaluate the fluid migration threshold of a hydrating cement slurry. Based on this, the cement slurry can be manipulated in order to produce a fluid migration resistant cement slurry. As used herein, the term "fluid migration resistant cement slurry" generally refers to a cement slurry that is capable of preventing or reducing fluid migration after primary cementing. Specifically, a fluid migration resistant cement slurry has a fluid migration threshold pressure that exceeds the formation pore pressure. More specifically, the fluid migration resistant cement slurry of the embodiments herein has a fluid migration threshold pressure that exceeds the formation pore pressure of a specific subterranean formation. One goal of the embodiments herein may be, for example, to manipulate cement slurry so as to maximize the rate of increase over time of the fluid migration threshold, as depicted in FIG. 1.

In some embodiments, a method is provided comprising providing a wellbore in a subterranean formation; providing a proposed cement slurry; calculating a fluid migration threshold; manipulating the proposed cement slurry based on the fluid migration threshold so as to produce a fluid migration resistant cement slurry; introducing the fluid migration resistant cement slurry into the wellbore in the subterranean formation; and curing the fluid migration resistant cement slurry in the wellbore in the subterranean formation.

I. Cement Slurry and Fluid Migration Resistant Cement Slurry Properties

In some embodiments, the cement slurry and the fluid migration resistant cement slurry of the embodiments herein comprise a base fluid and a cementitious material. Any aqueous base fluid suitable for use in a subterranean operation (e.g., drilling or completion operations) may be used in the cement slurry or fluid migration resistant cement slurry of the embodiments herein. Suitable base fluids include, but are not limited to, freshwater; saltwater (e.g., water containing one or more salts dissolved therein); brine (e.g., saturated saltwater); seawater; and any combination thereof. Generally, the base fluid may be from any source, provided, for example, that it does not contain an excess of compounds that may undesirably affect other components in the cement slurry or fluid migration resistant cement slurry. In some embodiments, the base fluid may be included in an amount sufficient to form a pumpable slurry. In some embodiments, the base fluid in the cement slurry may be foamed or gelled.

The cementitious material of the embodiments herein may be any cementitious material suitable for use in subterranean operations. In preferred embodiments, the cementitious material may be a hydraulic cement. Hydraulic cements harden by the process of hydration due to chemical reactions to produce insoluble hydrates (e.g., calcium hydroxide) that occur independent of the cement's water content (e.g., hydraulic cements can harden even under constantly damp conditions). Thus, hydraulic cements are preferred because they are capable of hardening regardless of the water content of a particular subterranean formation. Suitable hydraulic cements include, but are not limited to Portland cement; Portland cement blends (e.g., Portland blast-furnace slag cement and/or expansive cement); non-Portland hydraulic cement (e.g., super-sulfated cement, calcium aluminate cement, and/or high magnesium-content cement); and any combination thereof.

In some embodiments, the cement slurry or the fluid migration resistant cement slurry may additionally comprise a pozzolanic material. Pozzolanic materials may aid in increasing the density and strength of the cementitious material. As used herein, the term "pozzolanic material" refers to a siliceous material that, while not being cementitious, is capable of reacting with calcium hydroxide (which may be produced during hydration of the cementitious material). Because calcium hydroxide accounts for a sizable portion of most hydrated hydraulic cements and because calcium hydroxide does not contribute to the cement's properties, the combination of cementitious and pozzolanic materials may synergistically enhance the strength and quality of the cement. Any pozzolanic material that is reactive with the cementitious material may be used in the methods of the embodiments herein. Suitable pozzolanic materials include, but are not limited to silica fume; metakaolin; fly ash; diatomaceous earth; calcined or uncalcined diatomite; calcined fullers earth; pozzolanic clays; calcined or uncalcined volcanic ash; bagasse ash; pumice; pumicite; rice hull ash; natural and synthetic zeolites; slag; vitreous calcium aluminosilicate; and any combinations thereof. In some embodiments, the pozzolanic material may be present in an amount in the range of a lower limit of about 5%, 7.5%, 10%, 12.5%, 15%, 17.5%, 20%, 22.5%, 25%, 27.5%, 30%, and 32.5% to an upper limit of about 60%, 57.5%, 55%, 52.5%, 50%, 47.5%, 45%, 42.5%, 40%, 37.5%, 35%, and 32.5% by weight of the dry cementitious material. In preferred embodiments, the pozzolanic material may be present in an amount of about 5% to about 30% by weight of the dry cementitious material.

In some embodiments, the cement slurry or the fluid migration resistant cement slurry of the embodiments herein may further comprise any cement additive capable of use in a subterranean operation. Cement additives may be added in order to modify the characteristics of the cement slurry or the fluid migration resistant cement slurry. Such cement additives include, but are not limited to, a defoamer; a cement accelerator; a cement retarder; a fluid-loss additive; a cement dispersant; a cement extender; a weighting agent; a lost circulation additive; and any combinations thereof. The cement additives of the embodiments herein may be in any form, including powder form or liquid form.

In some embodiments, the cement slurry or the fluid migration resistant cement slurry of the embodiments herein may comprise a base fluid, a cementitious material, and any of one, more than one, or all of a pozzolanic material and a cement additive. Based on the fluid migration threshold and curing time, the cement slurry of the embodiments herein may be manipulated either by adding, removing or adjusting the presence or absence or amount of the base fluid, cementitious material, pozzolanic material, if present, or cement additive, if present, in order to produce the fluid migration resistant cement slurry of the embodiments herein. In some embodiments, the components of the cement slurry may be both adjusted, removed, and/or added to produce the fluid migration resistant cement slurry.

II. Fluid Migration Threshold

The potential of fluid migration in a cement slurry is related to the potential of a fluid (which may also be referred to herein as a "bubble") to migrate within a cement slurry and encompasses the fluid migration threshold of the cement slurry. The fluid migration threshold describes a critical pressure at which a crack will form in a hydrating cement slurry, and the critical pressure varies with time (e.g., the fluid migration threshold will increase the longer a cement slurry has to hydrate and harden). That is, the fluid migration threshold describes the pressure that must be exerted by an external fluid in order to penetrate and cause cracks within a hydrating cement slurry. The fluid migration threshold may depend, at least in part, upon the mechanical properties of the cement slurry and pressure differences between an external fluid and the hydrating cement slurry. Additionally, it may be related to the type and amount of cementitious material and base fluid in the cement slurry, as well as the type and amount of any pozzolanic material and/or cement additives.

The time at which a crack propagation may occur within a hydrating cement slurry corresponds to the time at which the fluid migration threshold is reached and the critical pressure of the fluid is able to overcome the opposing pressures and strength of the cement slurry. The fluid migration threshold, $P_C$, may be determined based on linear elastic fracture mechanics due to the crack propagation shape formed when fluid migrates within a hydrating cement slurry:

$$P_C = \frac{K_{IC}^{6/5} \pi^{3/5} (1 - v^2)}{(12 V_{bub} E)^{1/5}} \quad (1)$$

where $K_{IC}$ is the tensile fracture toughness of the cement slurry. $K_{IC}$ may be evaluated using a fracture probe instrument which slowly penetrates the cement slurry to measure the fracture toughness at specified depths and hydration degrees. Fracture probe instruments are used to determine tensile fracture toughness in marine cohesive sediments. $v$ is Poisson's ratio and E is Young's modulus which may be obtained, for example, using a flat dilatometer, which may be a miniature flat dilatometer depending on the application, which slowly penetrates the cement slurry to measure the Young's modulus value at specified depths and hydration degrees. Flat dilatometers are commonly used to determine Young's modulus values in marine cohesive sediments. Finally, $V_{bub}$, the initial volume of the bubble, may be estimated using the equation:

$$V_{bub} = \frac{4}{3} \pi r^2 \quad (2)$$

where r is the radius of a pore through which fluid may traverse to enter into the hydrating cement slurry and cause crack propagation (e.g., a pore in a subterranean formation).

III. Fluid Migration Threshold Time

In some embodiments, a method is provided herein comprising providing a wellbore in a subterranean formation; providing a proposed cement slurry; calculating a fluid migration threshold; calculating a fluid migration threshold time; manipulating the proposed cement slurry based on the fluid migration threshold and the fluid migration time so as to produce a fluid migration resistant cement slurry; introducing the fluid migration resistant cement slurry into the wellbore in the subterranean formation; and curing the fluid migration resistant cement slurry in the wellbore in the subterranean formation. The fluid migration threshold pressure ($P_C$) of the hydrating cement slurry may be used to determine the fluid migration threshold time. The fluid migration resistant cement slurry of the embodiments herein may be preferably formed such that the fluid migration threshold pressure ($P_C$) exceeds the formation pore pressure.

Figure 2:
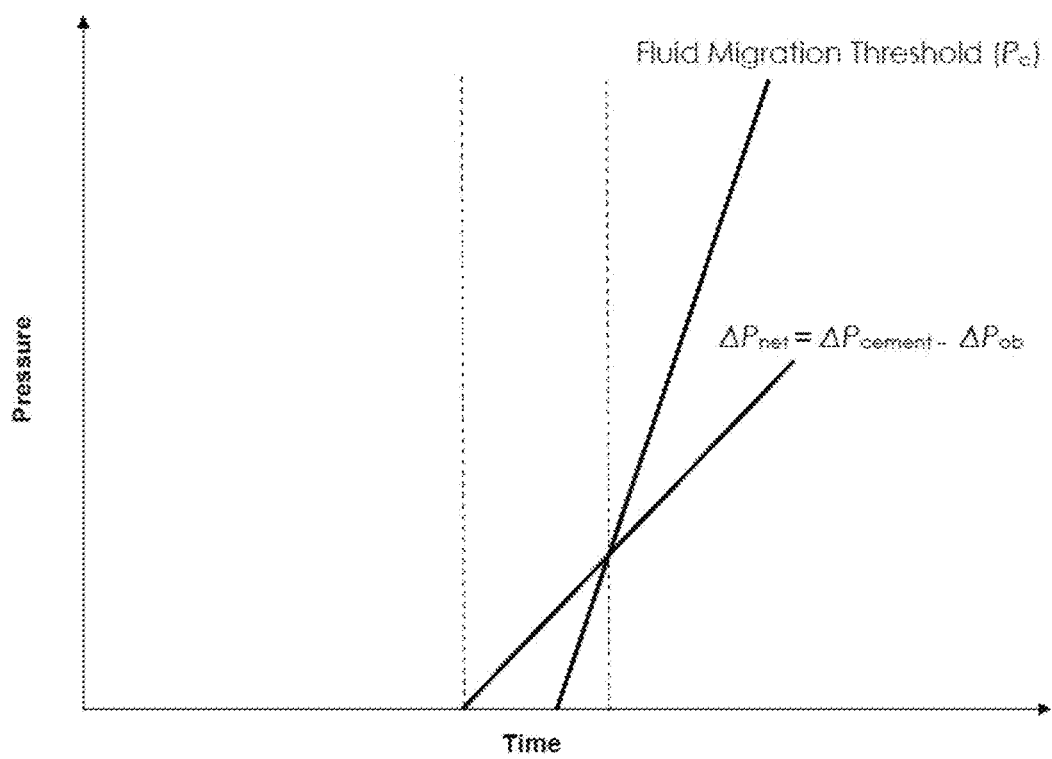
FIG. 2 depicts the fluid migration threshold time in a given subterranean formation based on the intersection between a line represented by fluid migration threshold values over time and the difference between the transient hydrostatic pressure drop in a hydrating cement slurry ($\Delta P_{cement}$) and the overburden pressure between the initial hydrostatic pressure of the cement slurry and the formation pore pressure ($\Delta P_{ob}$).

During hydration, the fluid migration threshold ($P_C$) of a cement slurry varies with time, and is thus necessarily represented by multiple values on a line, as shown in FIG. 2. As shown in FIG. 2, the fluid migration threshold time is reached at the time of intersection between the fluid migration threshold value line and the line represented by the net formation pore pressure, $\Delta P_{net}$, applied to the cement slurry and the subterranean formation. $\Delta P_{net}$ may be calculated using the formula:

$$\Delta P_{net} = \Delta P_{cement} - \Delta P_{ob} \quad (3)$$

where $\Delta P_{cement}$ is the transient hydrostatic pressure drop in the hydrating cement slurry during hydration and where $\Delta P_{ob}$ is the overburden pressure between the initial hydrostatic pressure of the cement slurry and the formation pore pressure.

IV. Fluid Flow Potential Ratio

In some embodiments, the embodiments herein provide for a method comprising providing a wellbore in a subterranean formation; providing a proposed cement slurry; calculating a fluid migration threshold; calculating a fluid migration threshold time; calculating a fluid flow potential ratio value at the fluid migration threshold time; manipulating the proposed cement slurry based on the fluid flow potential ratio so as to reduce the value of the fluid flow potential ratio and produce a fluid migration resistant cement slurry; introducing the fluid migration resistant cement slurry into the wellbore in the subterranean formation; and curing the fluid migration resistant cement slurry in the wellbore in the subterranean formation.

Figure 3:
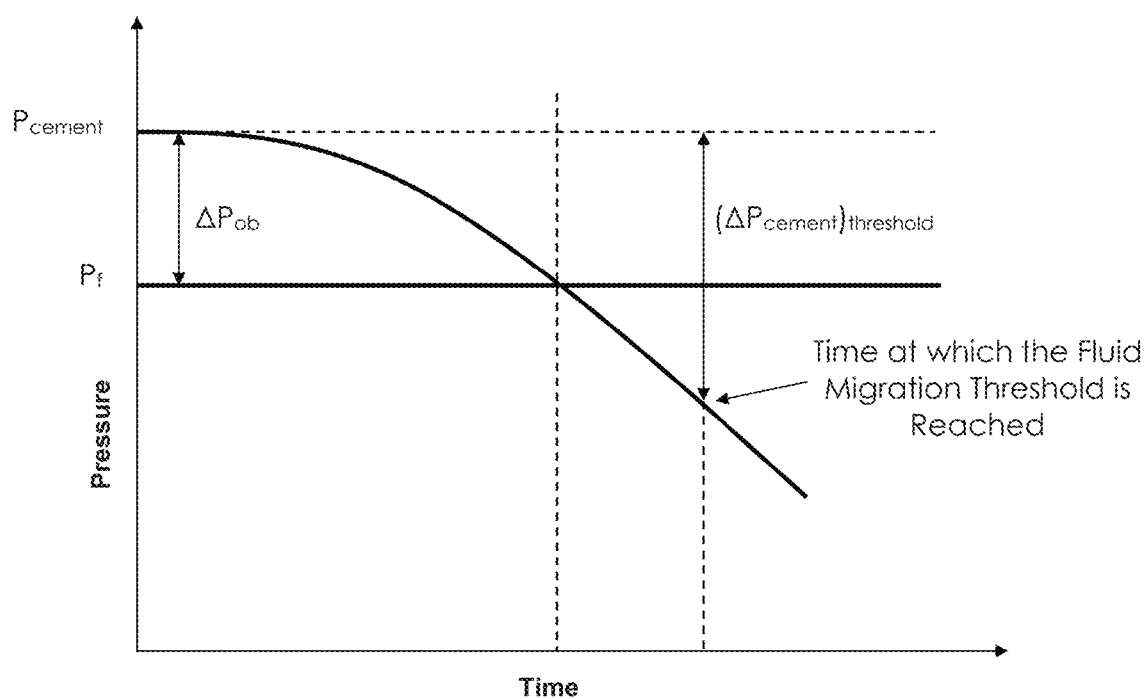
FIG. 3 shows the transient hydrostatic pressure drop in a hydrating cement slurry ($\Delta P_{cement}$) and the overburden pressure between the hydrostatic pressure of the cement slurry and the formation pore pressure ($\Delta P_{ob}$), given a subterranean fluid pressure ($P_f$) and cement slurry pressure ($P_{cement}$).

As used herein, the term "fluid flow potential ratio" refers to the severity of fluid invasion at a particular fluid migration threshold time in a particular subterranean formation. The fluid flow potential ratio is calculated by the formula:

$$FFP = \frac{(\Delta P_{cement})_{threshold}}{\Delta P_{ob}} \quad (4)$$

where FFP is the fluid flow potential ratio. $(\Delta P_{cement})_{threshold}$ is the hydrostatic pressure drop in the hydrating cement slurry during hydration at the time the fluid migration threshold is reached and $\Delta P_{ob}$ is the overburden pressure defined as the difference between the initial hydrostatic pressure of the cement slurry, $P_{cement}$ and the formation pore pressure, $P_f$. FIG. 3 depicts the relationship between $(\Delta P_{cement})_{threshold}$ cement/threshold and $\Delta P_{ob}$, given subterranean pressure $P_f$ and cement slurry pressure $P_{cement}$.

If the fluid flow potential ratio exceeds 1, at least minimal fluid flow at the time of reaching the fluid migration threshold time may be possible. As the fluid flow potential ratio increases in value, the severity of fluid flow at the time of reaching the fluid migration threshold time also occurs. A goal of the embodiments herein may be to reduce the value of the fluid flow potential ratio as much as possible so as to ensure that a fluid migration resistant cement slurry is formed.

Embodiments disclosed herein include:

A. A method comprising: providing a wellbore in a subterranean formation; providing a proposed cement slurry; calculating a fluid migration threshold; manipulating the proposed cement slurry based on the fluid migration threshold so as to produce a fluid migration resistant cement slurry; introducing the fluid migration resistant cement slurry into the wellbore in the subterranean formation; and curing the fluid migration resistant cement slurry in the wellbore in the subterranean formation.

B. A method comprising: providing a wellbore in a subterranean formation; providing a proposed cement slurry; calculating a fluid migration threshold; calculating a fluid flow potential ratio value at the fluid migration threshold time; manipulating the proposed cement slurry based on the fluid flow potential ratio so as to reduce the value of the fluid flow potential ratio and produce a fluid migration resistant cement slurry; introducing the fluid migration resistant cement slurry into the wellbore in the subterranean formation; and curing the fluid migration resistant cement slurry in the wellbore in the subterranean formation.

Each of embodiments A and B may have one or more of the following additional elements in any combination:

Element 1: Wherein the proposed cement slurry comprises a base fluid and a cementitious material.

Element 2: Wherein the cementitious material is a hydraulic cement.

Element 3: Wherein the proposed cement slurry formulation is manipulated to produce the fluid migration resistant cement slurry by altering an amount of the cementitious material.

Element 4: Wherein the proposed cement slurry formulation is manipulated to produce the fluid migration resistant cement slurry by altering an amount of the base fluid.

Element 5: Wherein the proposed cement slurry formulation further comprises a pozzolanic material.

Element 6: Wherein the proposed cement slurry formulation further comprises a pozzolanic material selected from the group consisting of silica fume; metakaolin; fly ash; diatomaceous earth; calcined or uncalcined diatomite; calcined fullers earth; pozzolanic clays; calcined or uncalcined volcanic ash; bagasse ash; pumice; pumicite; rice hull ash; natural and synthetic zeolites; slag; vitreous calcium aluminosilicate; and any combinations thereof.

Element 7: Wherein the proposed cement slurry formulation further comprises a pozzolanic material, and wherein the proposed cement slurry formulation is manipulated to produce the fluid migration resistant cement slurry by altering an amount of the pozzolanic material.

Element 8: Wherein the proposed cement slurry further comprises a cement additive selected from the group consisting of a defoamer; a cement accelerator; a cement retarder; a fluid-loss additive; a cement dispersant; a cement extender; a weighting agent; a lost circulation additive; and any combinations thereof.

By way of non-limiting example, exemplary combinations applicable to A, B, C include: A with 2, 4, and 8; A with 2 and 6; B with 2, 5, and 7; and B with 2, 3, 4, and 5.

To facilitate a better understanding of the embodiments herein, the following examples of preferred or representative embodiments are given. In no way should the following examples be read to limit, or to define, the scope of the disclosure.

Example 1

Figure 4:
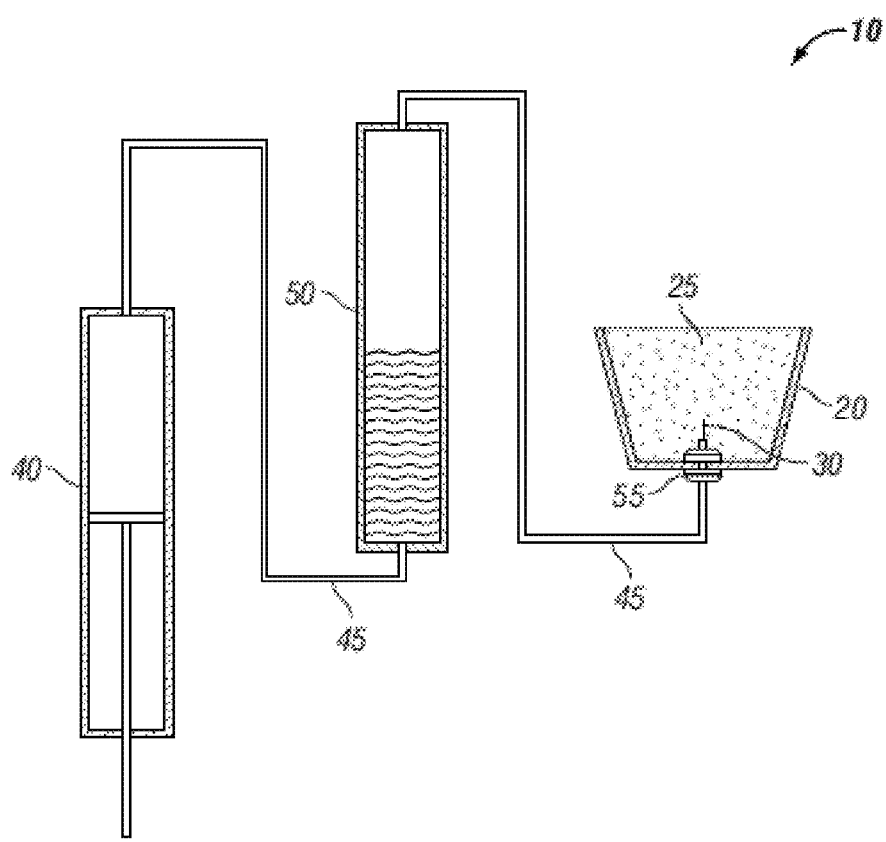
FIG. 4 depicts a schematic of an experimental set up used to evaluate fluid migration thresholds under real-time conditions.

In this example, a cement slurry was evaluated to determine the correlation between the elapse of time after mixing the cement slurry components and the fluid migration threshold. The experimental set up 10 depicted in FIG. 4 was used to evaluate the fluid migration threshold under real-time conditions. Beaker 20 was filled with 600 mL of cement slurry 25. The cement slurry was prepared by combining: 762.3 g of Texas Lehigh Class H Cement, available from AHI Supply in Alvin, Tex.; 22.9 g of calcium chloride; 350.7 g of fresh water; and 4.6 g of D-AIR 3000™, available from Halliburton Energy Services, Inc. in Houston, Tex. Air was pushed through a syringe pump 40 connected by tubing 45 first to water-air reservoir 50 and then to needle 30, creating a continuous air flow path. Needle 30 was inserted through fitting 55 attached to the bottom of beaker 20 and glued into place. Air was pumped into cement slurry 25 in beaker 20 at a constant flow rate of 10 mL/min until it broke through the cement, representing the fluid migration threshold.

Figure 5:
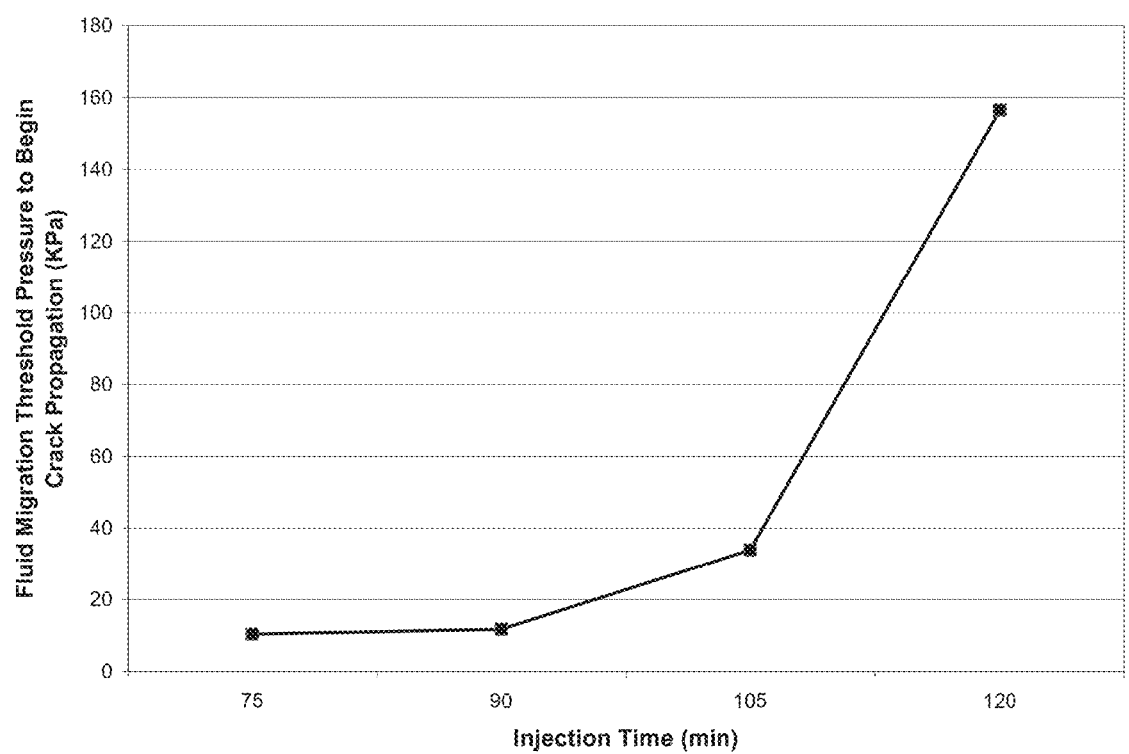
FIG. 5 graphs the differential pressures required to breach the fluid migration threshold and cause fluid invasion (e.g., crack propagation) of a cement slurry using a steady injection of air at 10 mL/min.

In this example, the fluid migration threshold pressure was measured after applying air into the cement slurry 25 in the experimental set up 10, as described above, after the elapse of either 60 minutes, 75 minutes, 90 minutes, 105 minutes, and 120 minutes after preparing the cement slurry. The results demonstrate that the fluid migration threshold pressure required to begin crack propagation within cement slurry 25 increased as the cement slurry 25 had additional time to hydrate. The results are depicted in FIG. 5.

Example 2

Figure 6A:
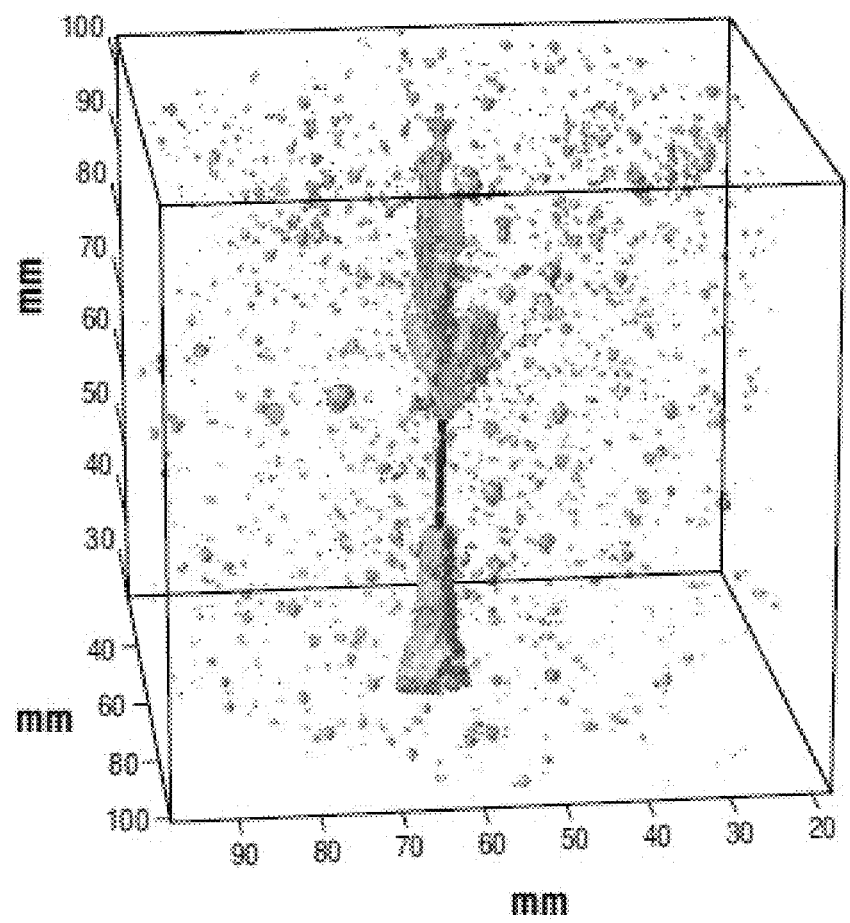
FIG. 6A shows a side view 3D representation of crack propagation in a hydrating cement slurry using a steady injection of air at 10 mL/min after the elapse of 75 minutes following preparation of the cement slurry.
Figure 6B:
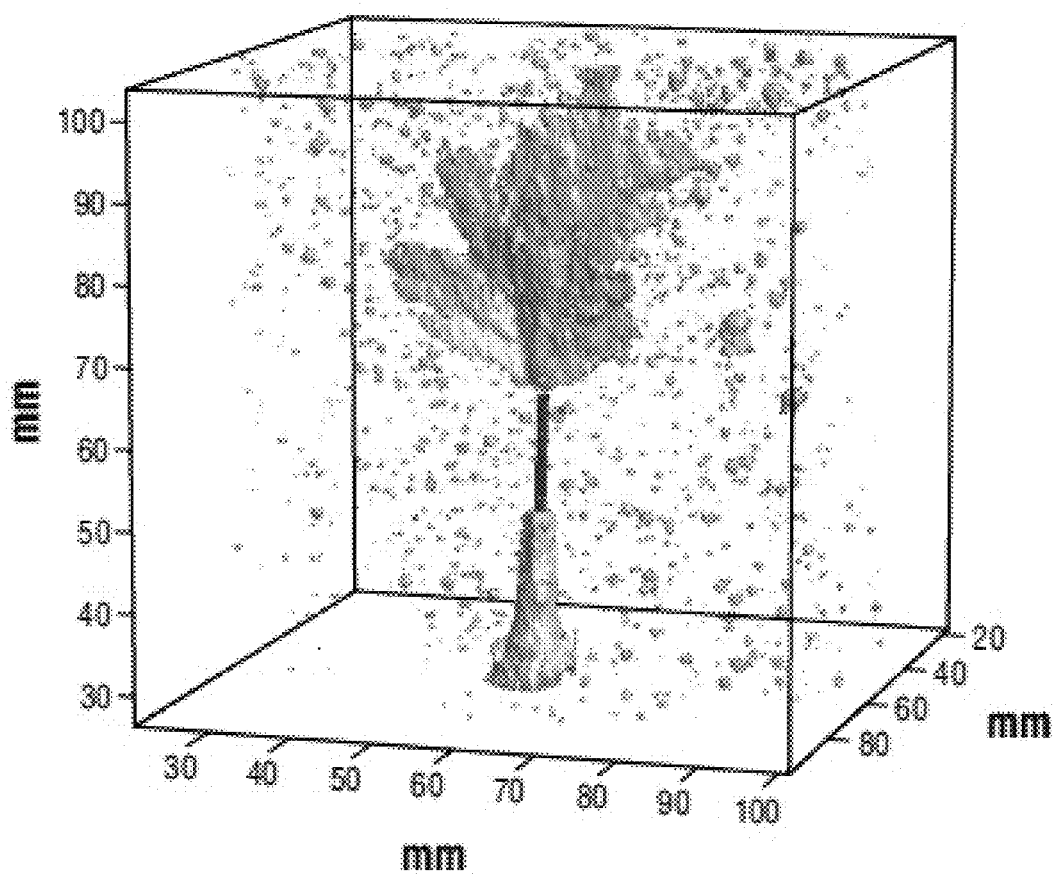
FIG. 6B shows a front view 3D representation of crack propagation in a hydrating cement slurry using a steady injection of air at 10 mL/min after the elapse of 75 minutes following preparation of the cement slurry.

In this example, the experimental set up and cement slurry of Example 1 were used to inject air at a constant flow rate of 10 mL/min after the elapse of 75 minutes after preparing the cement slurry. Using MATLAB® Software, a 3D reconstruction of the fluid migration and flow prior to the cement slurry fully hydrating was prepared and is depicted in FIG. 6A (side view) and FIG. 6B (front view). FIG. 5*a* and FIG. 5*b* show the crack propagation once the fluid migration threshold was breached at the tip of the needle 30 (from FIG. 4), located approximately 52 mm within the cement slurry, and fluid migration into the cement slurry began. The crack propagation created is approximately 40 mm in length and approximately 1 mm thick.

Figure 7:
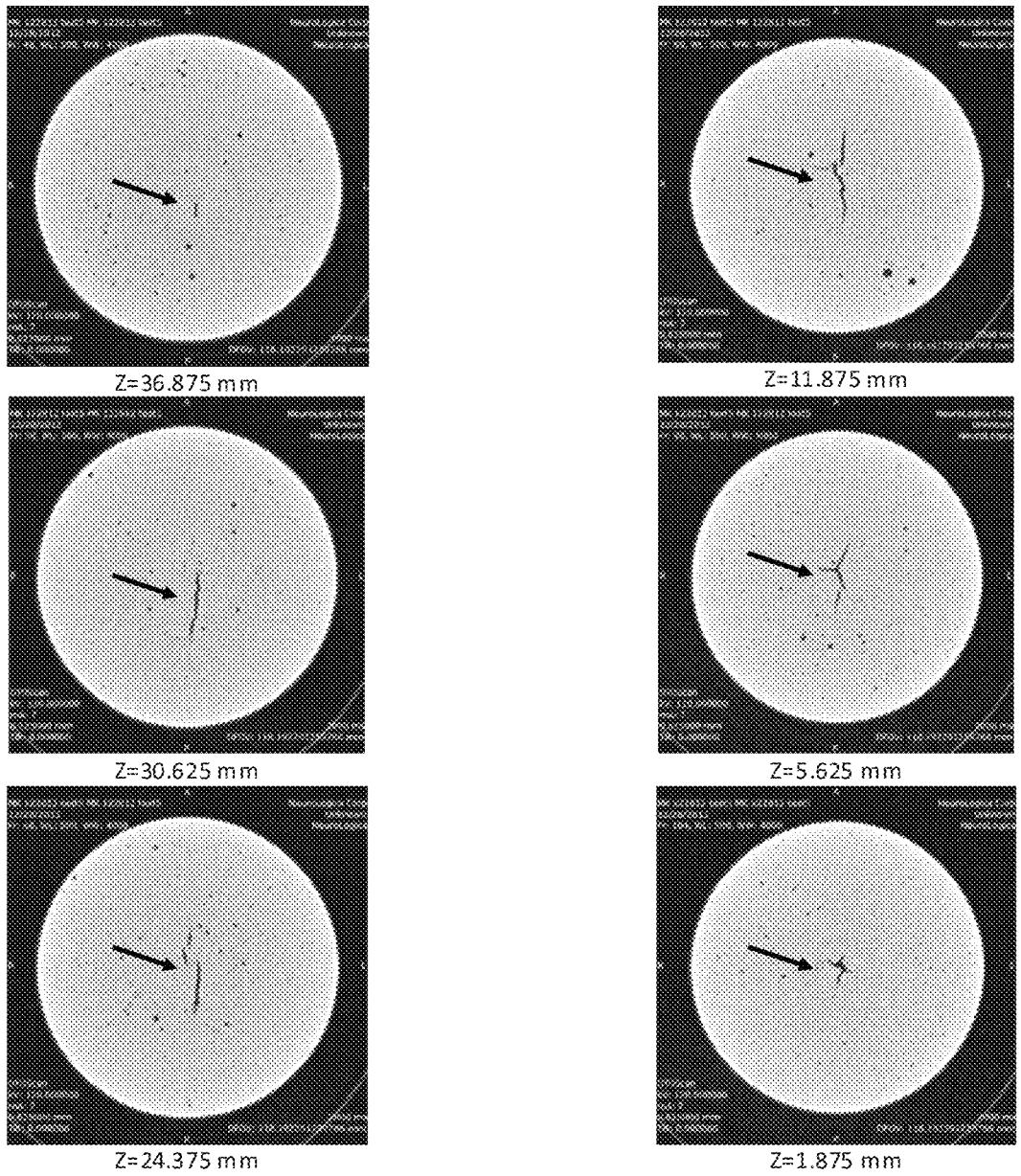
FIG. 7 shows traverse plane CT scans at varying elevations of crack propagation in a hydrating cement slurry using a steady injection of air at 10 mL/min after the elapse of 75 minutes following preparation of the cement slurry.

CT scans were also performed at varying elevations of traverse planes of the fully hydrated cement slurry, demonstrating the cracks formed through crack propagation, as shown in FIG. 7. In the figure, "Z" represents the elevation from the tip of needle 30 (from FIG. 4) in mm. At 1.875 mm, the traverse plane view of the crack propagation can be seen as a small star-shaped opening having four thin radiations. The star-shaped opening is approximately 2 mm. At 5.625 mm, the traverse plane view of the crack propagation shows that three of the four thin radiations of the star-shaped opening seen at 1.875 mm to propagate outward, and the opening at the center of the star-shaped opening has lengthened and thinned. The length of the newly forming crack propagation between furthest radiations is approximately 22.7 mm and the thickest part of the crack propagation at any one area is approximately 1.3 mm. At 11.875 mm, the traverse plane view of the crack propagation has narrowed to form a longer crack or channel-shape in a single coronal plane. The length between the furthest radiations of the crack propagation is approximately 32.2 mm and the thickest part of the crack propagation at any one area is approximately 1.4 mm. Moving farther from the tip of needle 30 (from FIG. 4), at 24.375 mm, the crack propagation has decreased in length and shows two separate smaller (nearly one-third the length) cracks. The length of the longer crack propagation is approximately 17.4 mm, whereas the length of the two separate smaller cracks is approximately 6.5 mm. The thickest part of any one of the crack propagations at any one area is approximately 1.2 mm. At 30.625 mm, the crack is again a single uniform opening. It is approximately 21.6 mm in length between the furthest radiations and the thickest part of the crack propagation at any one area is approximately 1.2 mm. Finally, at 36.875 mm, the crack has ceased propagating and can be seen as a slightly elongated (e.g., rod-shaped) point-opening. The point-opening is approximately 4.9 mm in length and the thickest part of the crack propagation at any one area is approximately 0.9 mm.

Example 4

Figure 8A:
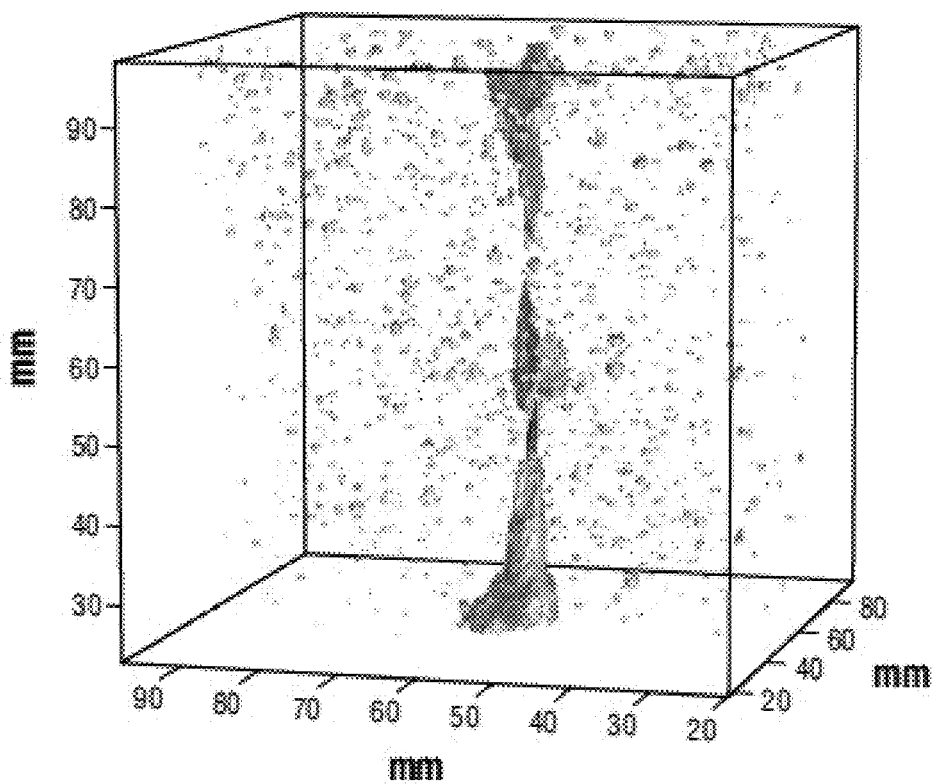
FIG. 8A shows a side view 3D representation of crack propagation in a hydrating cement slurry using a steady injection of air at 10 mL/min after the elapse of 90 minutes following preparation of the cement slurry.
Figure 8B:
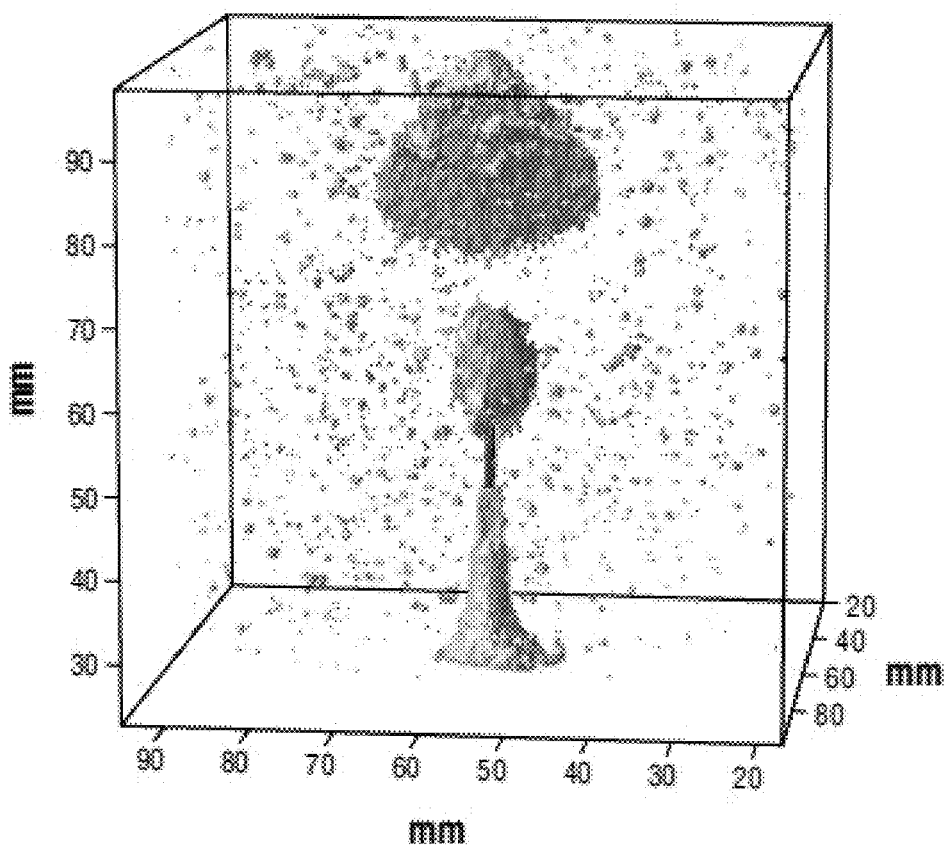
FIG. 8B shows a front view 3D representation of crack propagation in a hydrating cement slurry using a steady injection of air at 10 mL/min after the elapse of 90 minutes following preparation of the cement slurry.

In this example, the experimental set up and cement slurry of Example 1 were used to inject air at a constant flow rate of 10 mL/min after the elapse of 90 minutes after preparing the cement slurry. A 3D reconstruction was created of the crack propagation in the cement slurry once the fluid migration threshold was breached at the tip of the needle 30 (from FIG. 4) located approximately 52 mm within the cement slurry, as depicted in FIG. 8A (side view) and FIG. 8B (front view). The 3D reconstruction was obtained using the MATLAB® Software based on plane CT scans performed at varying elevations of traverse planes of the fully hydrated cement slurry, as detailed in FIG. 9. The crack propagation appears as two disc-shaped cracks, the size of the opening in each crack increased with elevation. For example, it increased from approximately 1.1 mm at the tip of the needle to 2.0 mm and 3.6 mm, at elevations 30.00 mm and 36.25 mm above the tip of the needle, respectively. A thinner crack is visible in the CT scans in FIG. 9 at elevations between the two discs but it was not thick enough to appear on the 3D reconstruction. Elevation 17.5 mm corresponds to the region between the two discs shown in FIG. 8. At this elevation, a thin crack is still visible in the CT scan in FIG. 9 but the void volume in the crack was not large enough to appear on the 3D reconstruction.

Figure 9:
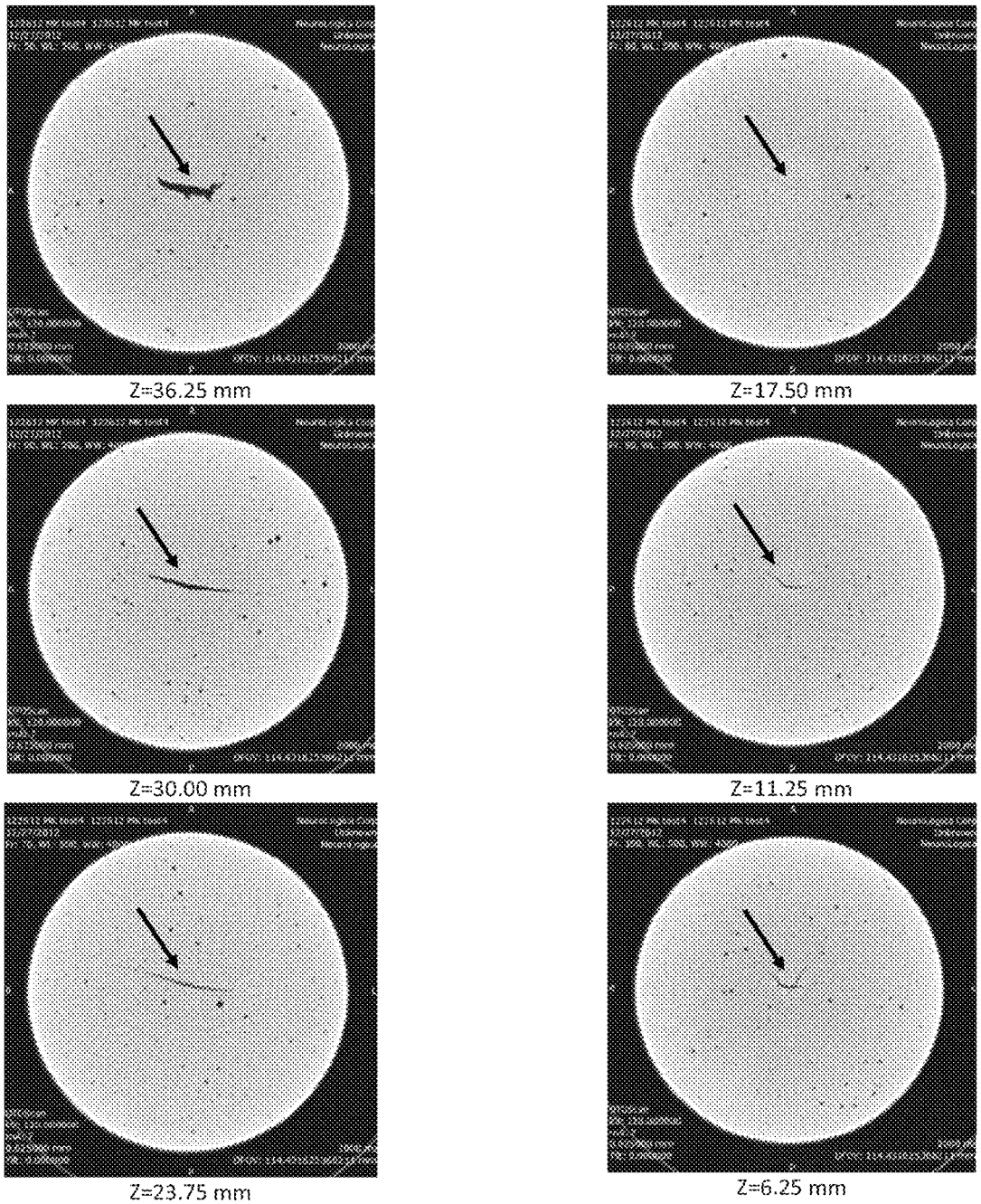
FIG. 9 shows traverse plane CT scans at varying elevations of crack propagation in a hydrating cement slurry using a steady injection of air at 10 mL/min after the elapse of 90 minutes following preparation of the cement slurry.

The CT scans are shown in FIG. 9. In the figure, "Z" represents the elevation from the tip of needle 30 (from FIG. 4) in mm. At 6.25 mm, the traverse plane view of the crack propagation can be seen as a finely branched crack opening having a single thin radiation. The branched crack opening is approximately 1.1 mm. At 11.25 mm, the traverse plane view of the crack propagation shows that the single thin radiation is no longer visible. The length of the crack propagation approximately 11.1 mm and the thickest part of the crack propagation at any one area is approximately 0.9 mm. At 17.50 mm, the traverse plane view of the crack propagation reveals a very thin crack that is barely visible in the CT scans. The length of the crack propagation is approximately 18.4 mm and the thickest part of the crack propagation at any one area is smaller than about 1.0 mm. Moving farther from the tip of needle 30 (from FIG. 4), at 23.75 mm, the crack propagation has increased in both length and thickness. The length of the longer crack propagation is approximately 27.4 mm and the thickest part of the crack propagation at any one area is approximately 1.1 mm. At 30.00 mm, the crack has continued to thicken in width. It is approximately 26.4 mm in length and the thickest part of the crack propagation at any one area is approximately 2.0 mm. Finally, at 36.25 mm, the crack has decreased slightly in length but has substantially thickened in width. It is approximately 21.3 mm in length and the thickest part of the crack propagation at any one area is approximately 3.6 mm.

Example 5

Figure 10:
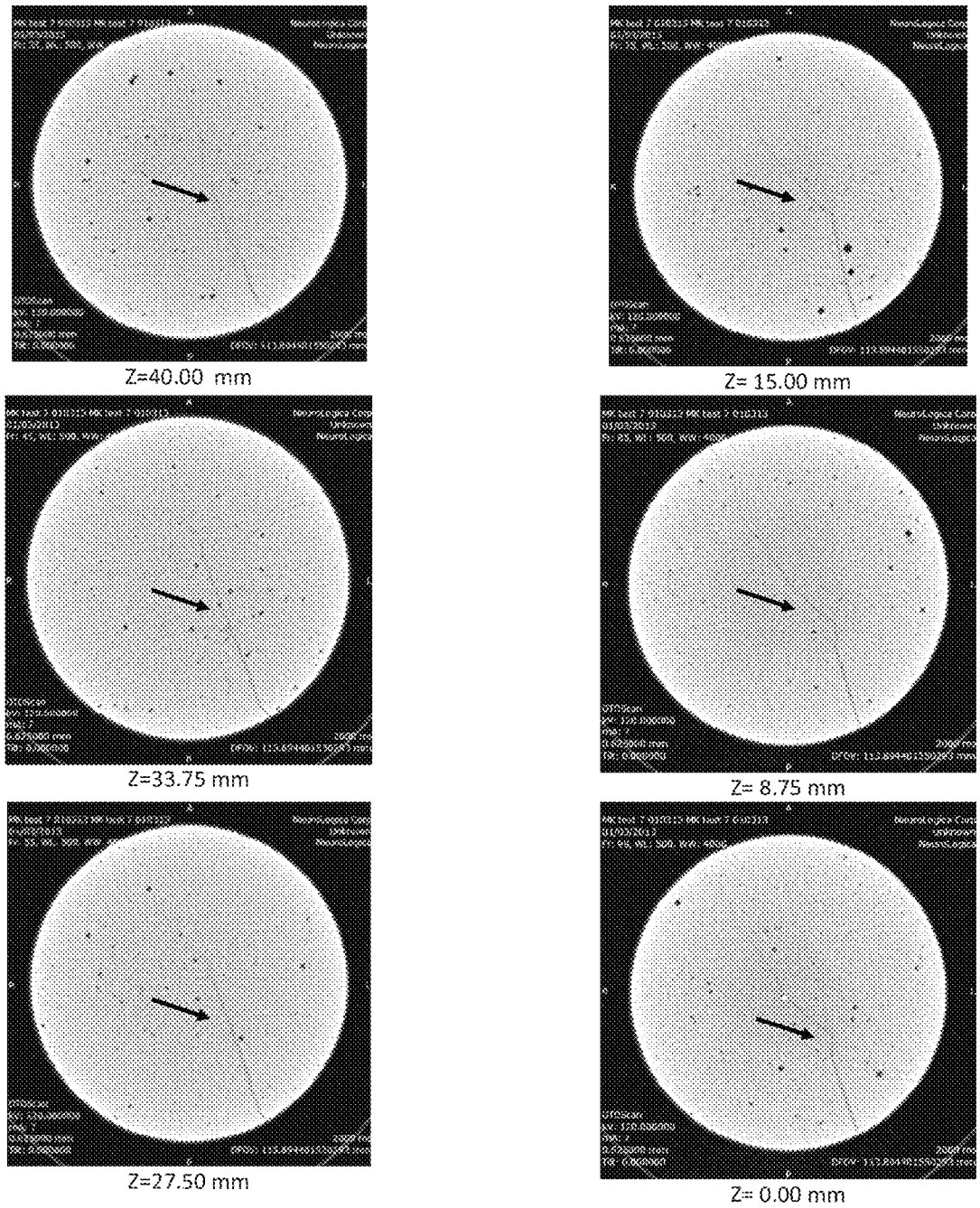
FIG. 10 shows traverse plane CT scans at varying elevations of crack propagation in a hydrating cement slurry using a steady injection of air at 10 mL/min after the elapse of 120 minutes following preparation of the cement slurry.

In this example, the experimental set up and cement slurry of Example 1 were used to inject air at a constant flow rate of 10 mL/min after the elapse of 120 minutes after preparing the cement slurry. CT scans also performed at varying elevations of traverse planes of the fully hydrated cement slurry, demonstrating thin cracks formed through crack propagation, as shown in FIG. 10. The longer the air was injected into the hydrating cement slurry, the thinner the cracks were that formed from crack propagation, which may be attributed to the fact that the Young's modulus of a hydrating cement slurry may increase with hydration time.

The CT scans are shown in FIG. 10. In the figure, "Z" represents the elevation from the tip of needle 30 (from FIG. 4) in mm. At 0.00 mm, the traverse plane view of the crack propagation can be seen as a fine crack opening spanning approximately the entire viewing area and having a bend roughly half of the distance from the center portion of the crack on one side. The fine crack opening is approximately 1.1 mm at its thickest portion. At 8.75 mm, the traverse plane view of the crack propagation shows a crack similar to the Z=0.00 mm crack, where it spans over approximately the entire viewing area. The length of the crack propagation is approximately 75.4 mm and the thickest part of the crack propagation at any one area is approximately 1.1 mm. At 15.00 mm, the traverse plane view of the crack propagation reveals that the fine crack has again decreased in length and the bend is again less pronounced. The length of the crack propagation is approximately 67.1 mm and the thickest part of the crack propagation at any one area is approximately 0.9 mm. Moving farther from the tip of needle 30 (from FIG. 4), at 27.50 mm, the bend is no longer visible and the length of the fine crack has decreased. The length of the fine crack is approximately 49.5 mm and the thickest part of the crack propagation at any one area is approximately 0.9 mm. At 33.75 mm and 40.00 mm, the fine crack remains substantially unchanged from its appearance at 27.50 mm.

In various embodiments, systems configured for preparing, transporting, and delivering the fluid migration resistant cement slurry described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey the fluid migration resistant cement slurry described herein. The pump may be, for example, a high pressure pump or a low pressure pump, which may depend on, inter alia, the viscosity and density of the fluid migration resistant cement slurry, the type of the cementing operation, and the like.

In some embodiments, the systems described herein may further comprise a mixing tank arranged upstream of the pump and in which the fluid migration resistant cement slurry may be formulated. In various embodiments, the pump (e.g., a low pressure pump, a high pressure pump, or a combination thereof) may convey the fluid migration resistant cement slurry from the mixing tank or other source of the fluid migration resistant cement slurry to the tubular. In other embodiments, however, the fluid migration resistant cement slurry can be formulated offsite and transported to a worksite, in which case the fluid migration resistant cement slurry may be introduced to the tubular via the pump directly from a transport vehicle or a shipping container (e.g., a truck, a railcar, a barge, or the like) or from a transport pipeline. In yet other embodiments, the fluid migration resistant cement slurry may be formulated on the fly at the well site where components of the fluid migration resistant cement slurry are pumped from a transport (e.g., a vehicle or pipeline) and mixed during introduction into the tubular. In any case, the fluid migration resistant cement slurry may be drawn into the pump, elevated to an appropriate pressure, and then introduced into the tubular for delivery downhole.

Figure 11:
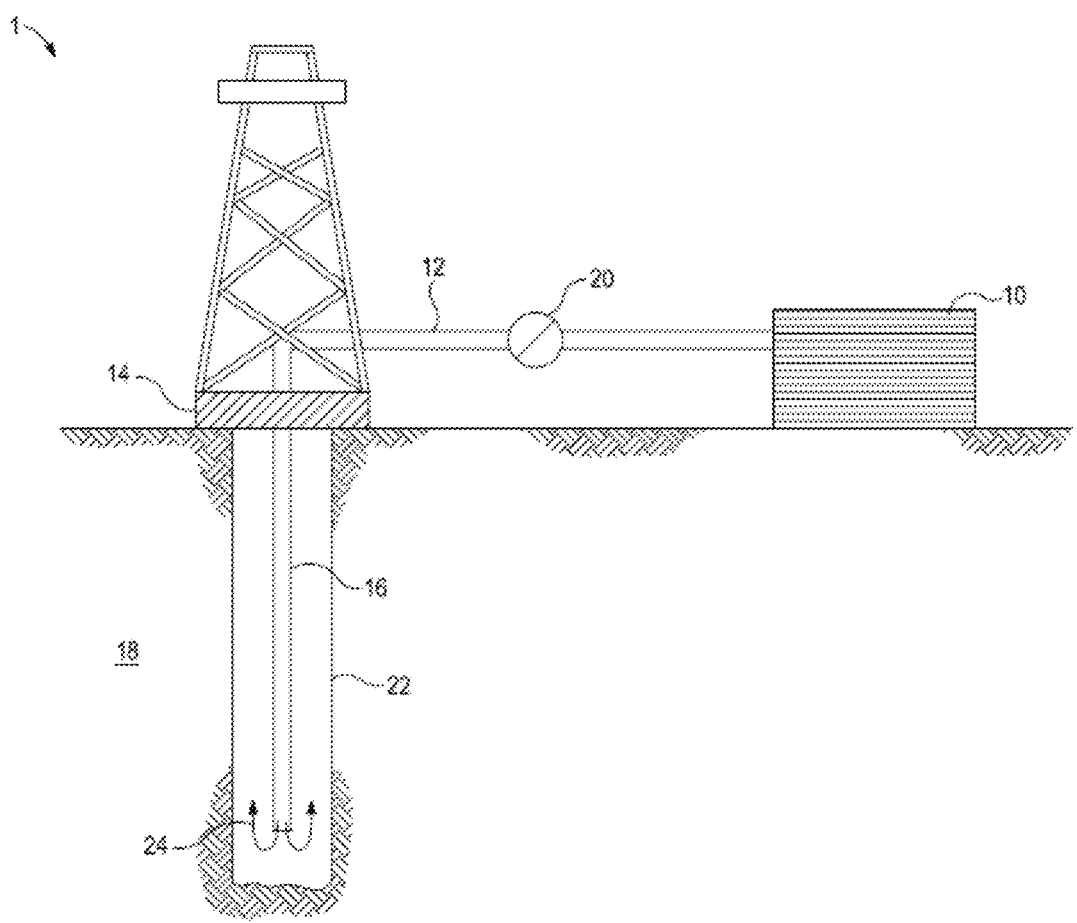
FIG. 11 depicts an embodiment of a system configured for delivering the fluid migration resistant cement slurry of the embodiments described herein to a downhole location.

FIG. 11 shows an illustrative schematic of a system that can deliver fluid migration resistant cement slurry described herein to a downhole location, according to one or more embodiments. It should be noted that while FIG. 11 generally depicts a land-based system, it is to be recognized that like systems may be operated in subsea locations as well. As depicted in FIG. 11, system 1 may include mixing tank 10, in which a fluid migration resistant cement slurry of the embodiments herein may be formulated. Again, in some embodiments, the mixing tank 10 may represent or otherwise be replaced with a transport vehicle or shipping container configured to deliver or otherwise convey the fluid migration resistant cement slurry to the well site. The fluid migration resistant cement slurry may be conveyed via line 12 to wellhead 14, where the fluid migration resistant cement slurry enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the fluid migration resistant cement slurry may subsequently return up the wellbore in the annulus between the tubular 16 and the wellbore 22 as indicated by flow lines 24. In other embodiments, the fluid migration resistant cement slurry may be reverse pumped down through the annulus and up tubular 16 back to the surface, without departing from the scope of the disclosure. Pump 20 may be configured to raise the pressure of the fluid migration resistant cement slurry to a desired degree before its introduction into tubular 16 (or annulus). It is to be recognized that system 1 is merely exemplary in nature and various additional components may be present that have not necessarily been depicted in FIG. 11 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 11 to provide for other cementing operations (e.g., squeeze operations, reverse cementing (where the cement is introduced into an annulus between a tubular and the wellbore and returns to the wellhead through the tubular), and the like).

It is also to be recognized that the disclosed fluid migration resistant cement slurry may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 11.

Therefore, the embodiments herein are well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the embodiments herein. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a wellbore in a subterranean formation;
   providing a proposed cement slurry comprising a base fluid and a cementitious material;
   calculating a fluid migration threshold pressure, the fluid migration threshold pressure ($P_C$) being the critical pressure required to cause a break in the proposed cement slurry during hydration and based on elastic fracture mechanics due to crack propagation shape, and calculated using the formula:

$$P_C = \frac{K_{IC}^{6/5} \pi^{3/5} (1 - v^2)}{(12 V_{bub} E)^{1/5}},$$

where $K_{IC}$ is a tensile fracture toughness of the cement slurry, $v$ is Poisson's ratio, $E$ is Young's modulus, and $V_{bub}$ is an initial volume of a crack propagation fluid bubble;
   manipulating the proposed cement slurry based on the fluid migration threshold pressure to maximize the rate of increase over time of the fluid migration threshold pressure and produce a fluid migration resistant cement slurry, such that the fluid migration threshold pressure exceeds a formation pore pressure and is achieved at or above a time of intersection with a net formation pore pressure ($\Delta P_{net}$) determined by the formula:
   $\Delta P_{net} = \Delta P_{cement} - \Delta P_{ob}$, where $\Delta P_{cement}$ is a transient hydrostatic pressure drop in the proposed cement slurry during hydration and where $\Delta P_{ob}$ is an overburden pressure between initial hydrostatic pressure of the proposed cement slurry and the formation pore pressure,
   wherein the proposed cement slurry is manipulated by adding, removing, or adjusting an amount of the base fluid, the cementitious material, or a combination of the base fluid and the cementitious material;
   introducing the fluid migration resistant cement slurry into the wellbore in the subterranean formation; and
   curing the fluid migration resistant cement slurry in the wellbore in the subterranean formation to form a cement sheath therein.

2. The method of claim 1, wherein the cementitious material is a hydraulic cement.

3. The method of claim 1, wherein the proposed cement slurry formulation is manipulated to produce the fluid migration resistant cement slurry by adding, removing, or adjusting the amount of the cementitious material.

4. The method of claim 1, wherein the proposed cement slurry formulation is manipulated to produce the fluid migration resistant cement slurry by adding, removing, or adjusting the amount of the base fluid.

5. The method of claim 1, wherein the proposed cement slurry formulation further comprises a pozzolanic material.

6. The method of claim 5, wherein the pozzolanic material is selected from the group consisting of silica fume; metakaolin; fly ash; diatomaceous earth; calcined or uncalcined diatomite; calcined fullers earth; pozzolanic clays; calcined or uncalcined volcanic ash; bagasse ash; pumice; pumicite; rice hull ash; natural and synthetic zeolites; slag; vitreous calcium aluminosilicate; and any combinations thereof.

7. The method of claim 5, wherein the proposed cement slurry formulation is manipulated to produce the fluid migration resistant cement slurry by adding, removing, or adjusting an amount of the pozzolanic material.

8. The method of claim 1, wherein the proposed cement slurry further comprises a cement additive selected from the group consisting of a defoamer; a cement accelerator; a cement retarder; a fluid-loss additive; a cement dispersant; a cement extender; a weighting agent; a lost circulation additive; and any combinations thereof.

9. The method of claim 8, wherein the proposed cement slurry formulation is manipulated to produce the fluid migration resistant cement slurry by adding, removing, or adjusting the amount of the cement additive.

10. A method comprising:
    providing a wellbore in a subterranean formation;
    providing a proposed cement slurry comprising a base fluid and a cementitious material;
    calculating a fluid migration threshold pressure at a given time, the fluid migration threshold pressure being the critical pressure required to cause a break in the proposed cement slurry during hydration and based on elastic fracture mechanics due to crack propagation shape, and calculated using the formula:

$$P_C = \frac{K_{IC}^{6/5} \pi^{3/5} (1 - v^2)}{(12 V_{bub} E)^{1/5}},$$

where $K_{IC}$ is a tensile fracture toughness of the cement slurry, $v$ is Poisson's ratio, $E$ is Young's modulus, and $V_{bub}$ is an initial volume of a crack propagation fluid bubble;
    calculating a fluid flow potential ratio value at the fluid migration threshold pressure at the given time using the formula:

$$FFP = \frac{(\Delta P_{cement})_{threshold}}{\Delta P_{ob}},$$

where FFP is the fluid flow potential ratio value, $(\Delta P_{cement})_{threshold}$ is hydrostatic pressure drop in the proposed cement slurry during hydration at a time in which the fluid migration threshold pressure is reached, and $\Delta P_{ob}$ is overburden pressure defined as a difference between initial hydrostatic pressure of the proposed cement slurry and formation pore pressure;

manipulating the proposed cement slurry based on the fluid flow potential ratio to reduce the value of the fluid flow potential ratio below a value of 1 and produce a fluid migration resistant cement slurry, and such that the fluid migration threshold pressure exceeds a formation pore pressure and is achieved at or above a time of intersection with a net formation pore pressure $(\Delta P_{net})$ determined by the formula:

$\Delta P_{net} = \Delta P_{cement} - \Delta P_{ob}$, where $\Delta P_{cement}$ is a transient hydrostatic pressure drop in the proposed cement slurry during hydration and where $\Delta P_{ob}$ is an overburden pressure between initial hydrostatic pressure of the proposed cement slurry and the formation pore pressure, wherein the proposed cement slurry is manipulated by adding, removing, or adjusting an amount of the base fluid, the cementitious material, or a combination of the base fluid and the cementitious material;

introducing the fluid migration resistant cement slurry into the wellbore in the subterranean formation; and curing the fluid migration resistant cement slurry in the wellbore in the subterranean formation to form a cement sheath therein.

11. The method of claim 10, wherein the cementitious material is a hydraulic cement.

12. The method of claim 10, wherein the proposed cement slurry formulation is manipulated to produce the fluid migration resistant cement slurry by adding, removing, or adjusting the amount of the cementitious material.

13. The method of claim 10, wherein the proposed cement slurry formulation is manipulated to produce the fluid migration resistant cement slurry by adding, removing, or adjusting the amount of the base fluid.

14. The method of claim 10, wherein the proposed cement slurry formulation further comprises a pozzolanic material.

15. The method of claim 14, wherein the pozzolanic material is selected from the group consisting of silica fume; metakaolin; fly ash; diatomaceous earth; calcined or uncalcined diatomite; calcined fullers earth; pozzolanic clays; calcined or uncalcined volcanic ash; bagasse ash; pumice; pumicite; rice hull ash; natural and synthetic zeolites; slag; vitreous calcium aluminosilicate; and any combinations thereof.

16. The method of claim 14, wherein the proposed cement slurry formulation is manipulated to produce the fluid migration resistant cement slurry by adding, removing, or adjusting an amount of the pozzolanic material.

17. The method of claim 10, wherein the proposed cement slurry further comprises a cement additive selected from the group consisting of a defoamer; a cement accelerator; a cement retarder; a fluid-loss additive; a cement dispersant; a cement extender; a weighting agent; a lost circulation additive; and any combinations thereof.

18. The method of claim 17, wherein the proposed cement slurry formulation is manipulated to produce the fluid migration resistant cement slurry by adding, removing, or adjusting the amount of the cement additive.

\* \* \* \* \*